March 24, 1970     M. MASS     3,502,437
IDENTIFICATION CARD
Filed March 13, 1967     2 Sheets-Sheet 1
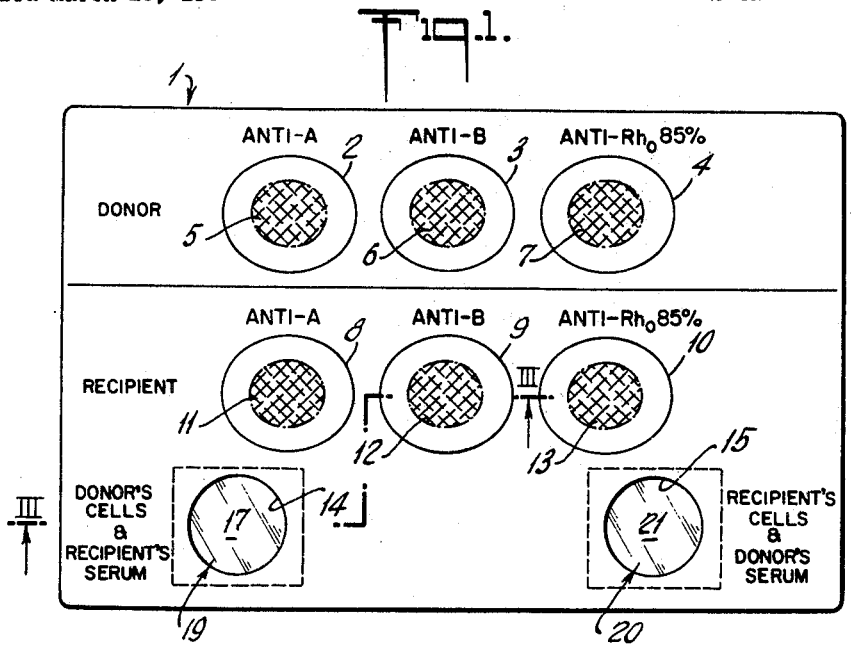
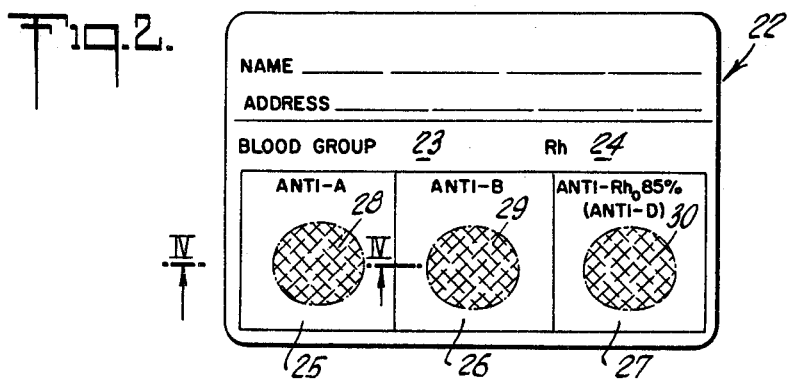
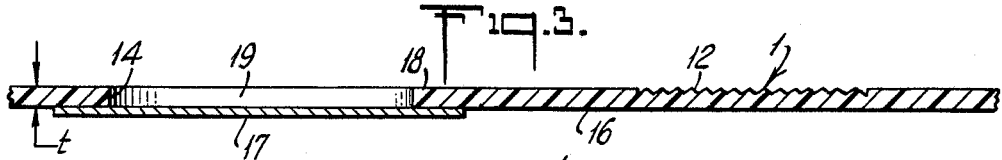
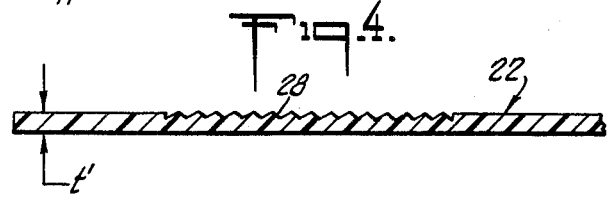
INVENTOR
MORRIS MASS
BY
Nolte & Nolte
ATTORNEYS March 24, 1970  M. MASS  3,502,437
IDENTIFICATION CARD
Filed March 13, 1967  2 Sheets-Sheet 2
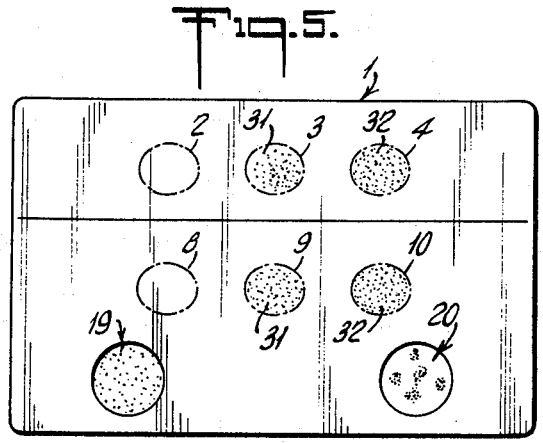
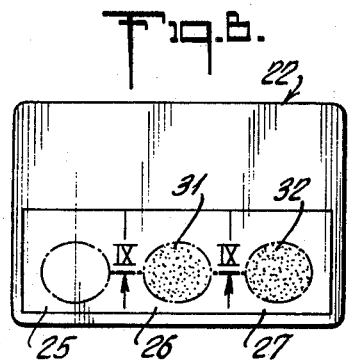
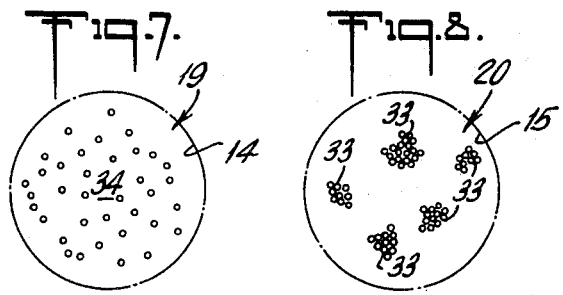
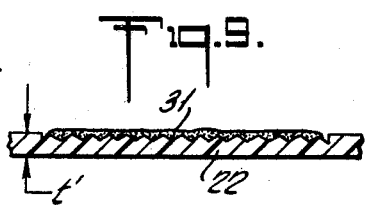
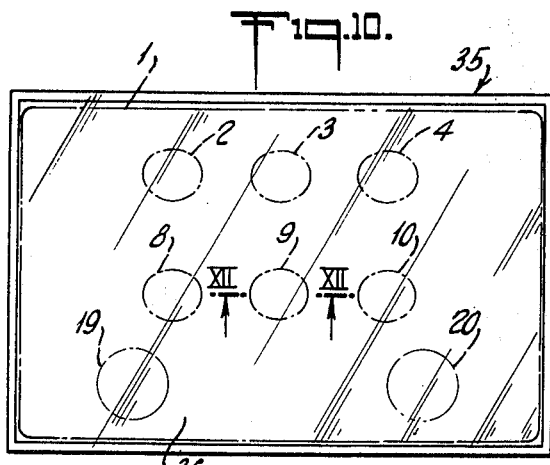
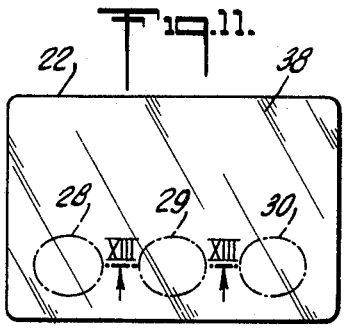
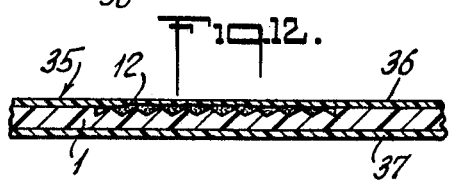
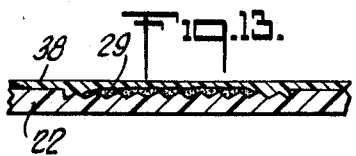
INVENTOR
MORRIS MASS
BY
Nolte & Nolte
ATTORNEYS

United States Patent Office 3,502,437
Patented Mar. 24, 1970

3,502,437
IDENTIFICATION CARD
Morris Mass, Kew Gardens, N.Y., assignor to Haematronics, Inc., New Rochelle, N.Y., a corporation of New York
Filed Mar. 13, 1967, Ser. No. 622,558
Int. Cl. G01m 33/16, 31/02
U.S. Cl. 23—253          9 Claims

ABSTRACT OF THE DISCLOSURE

An identification card, including means for indicating information relating to blood, and wherein a flat member having indicia on one surface thereof corresponding to an analysis of blood, together with means for comparing said analysis to a donor of said blood, are provided. The identification card includes means for preserving such information.

---

This invention relates to an identification card and more particularly to means for indicating information relating to blood.

Methods are known for determining information relating to blood such as blood grouping. Known procedures include the taking of a 1 x 3 inch glass slide, defining oval shaped boundaries on the slide with a wax pencil, marking the first oval "anti-A," the second oval "anti-B" and the third oval "Rh." A suspension which has been prepared in a saline solution includes samples of a patient's blood as drawn from a vein. Known sera are placed in the three ovals and given amounts of the suspension are added to the first and second oval, while blood alone of the patient is placed inside the third oval. The slide is thereafter placed over a light source and is tilted back and forth for at least three minutes, thereby allowing a reaction to take place. The person performing this known test observes the reactions in the three ovals and makes the following conclusions: If there is clumping in the first oval and not in the second oval, the patient has blood belonging to Group A; if there is clumping in the second oval and not in the first, the patient has blood belonging to Group B; if there is clumping in both the first and the second oval, patient has blood belonging to Group AB; if there is no clumping in either the first or the second oval, the patient has blood belonging to Group O; if there is clumping in the third oval marked Rh the person has Rh positive blood, while if there is no clumping in the third oval the person has Rh negative blood. In the usual case a technician performs the foregoing tests and he makes a separate recording of his findings, and the slide is discarded. Should the technician have made an error in performing the tests, or in observing the tests, or in transcribing his conclusions, which may be based on error, to the separate record, such fact will be unknown since the slide has been discarded and the separate written record is the only evidence of the test which survives.

Limitations and disadvantages of the prior art procedures include the necessity of keeping separate laboratory and clerical records, each subject to error in the transscription of information from one to the other. The sera must be handled and applied to laboratory apparatus, subjecting the sera to possible contamination. Furthermore, known methods as described necessitate preparation for each test individually, as opposed to mass handling. In addition, no permanent record without the possibility of clerical errors exists and further clerical errors are possible in transcribing blood information onto a paper which the blood donor may carry indicating his blood group.

An object of the present invention is to provide an identification card which may be carried by a person or be kept in a permanent record and indicating information such as blood grouping and cross matching data.

Another object of the present invention is to provide a composite portable structure to be used as identification means for indicating the carrier's blood group in the event of an accident or emergency.

Another object of the present invention is to provide a single permanent record card or means containing information relating to a blood donor's blood group, a blood recipient's blood group, and cross matching information relating to the blood of both the donor and recipient. It is intended that this card or means be kept by institutions or agencies as a permanent record and evidence of the test performed with regard to such blood grouping and cross matching.

A further object of the present invention is to provide more efficient and rapid means for performing blood grouping and cross matching tests.

A still further object of the present invention is to provide means for preparing a permanent portable record to be carried by persons such that in the event of an emergency or accident the permanent record will indicate to a person rendering aid important blood data.

The present invention fulfills the aforementioned objects and overcomes the limitations and disadvantages of prior art solutions by providing an identification card that may be carried by a person or kept in a file as a permanent record of the blood data contained thereon. In one embodiment of the invention, an identification card is provided which contains both blood grouping and cross matching data. A substantially rigid and flat member contains indicia indicating the identification of a blood donor and a blood recipient. With regard to the blood grouping data, three areas on the identification card are isolated and labeled for the donor and for the recipient respectively, corresponding to anti-A, anti-B, and anti-Rh sera. The first isolated area on the card for the donor and a similar separate area for the recipient contain a predetermined amount of dried serum in the form of a coating secured to a portion of such area. The serum within the first spaces contains anti-A bodies which will agglutinate when mixed with the blood of a person possessing an A grouping. The second spaces provided for both the donor and recipient contain anti-B bodies which will agglutinate or clump in the presence of blood belonging to group B. The third spaces contain serum disposed on the identification card in much the same manner as for the first two spaces for the donor and recipient and will indicate the Rh factor of the person whose blood is mixed with the serum. Thus if there is clumping in the first space containing the anti-A bodies and not in the second space containing the anti-B bodies, the person's blood is group A. If there is clumping in the second space containing the anti-A bodies, the person has blood belonging to group B. Where there is clumping or agglutination in both the first and second spaces, the person has blood belonging to group AB. If there is no agglutination in either A or B, the person is group O. Similarly, where there is agglutination in the third space containing the anti-Rh bodies, the person's blood is Rh positive, while if there is no clumping in the third space the person has Rh negative blood.

Also provided in the above embodiment are two cavities formed in the identification card. The cavities are formed by means of a backing member covering a hole through the card, thereby creating a well of a height equal to the thickness of the card. The backing member is preferably a transparent material which is affixed to the underside of the card in such a manner as to afford a liquid tight seal for material placed within the cavity. The purpose of a cross matching test is to determine the compatibility between the blood donor's blood and the recipient's blood, both the donor and recipient being the same persons whose blood grouping was established according to the means described in the previous paragraph. The first cavity is labeled "donor's cells and recipient's serum" and accordingly the blood cells of a blood donor are mixed with the recipient's serum in the cavity and viewed microscopically with a light source which will penetrate the transparent backing member. If there is agglutination of the blood donor's cells and the recipient's serum, this information will be helpful in avoiding the transfusion of blood between persons whose blood is incompatible. In much the same manner, the second cavity is labeled "recipient's cells and donor's serum" and accordingly the blood recipient's cells are mixed with the donor's serum within the second cavity and viewed as was done for the first cavity. Should agglutination or clumping take place within the second cavity, then incompatibility will be observed. Thus, in this embodiment a composite and compact means is provided whereby the device actually used in performing both the blood grouping and the cross matching tests is retained such that future errors of transcription may be avoided or corrected. It is within the scope of this embodiment to provide a protective cover or means for preserving the results of the blood tests such that a person viewing the identification card some time after the tests were made will readily be able to determine the results of the tests. This embodiment also has the advantage of indicating partial or incomplete agglutination or clumping which need not be left to the conjecture of a technician but, on the contrary, may be observed and studied by an expert at a later time.

In another embodiment of the present invention, merely the blood grouping information as described above is contained on a card which may be carried by the ordinary layman or persons whose blood grouping is not of the common type. In this embodiment the anti-A, anti-B, and anti-Rh bodies are isolated in three spaces on the face of a small card, and the procedure described for the donor and recipient above may be used for determining and preserving a person's blood grouping. Also on the face of the card will appear the name and address of the person whose blood is to be tested and recorded, as well as a space for transcribing the results of the test which are visibly preserved.

The invention will be more clearly understood from the following description of specific embodiments of the invention together with the accompanying drawings wherein similar reference characters denote similar elements throughout several views, in which:

FIG. 1 is a plan view of the embodiment of the present invention wherein blood grouping and cross-matching identification is presented;

FIG. 2 is a plan view of another embodiment of the present invention wherein blood grouping identification is shown;

FIG. 3 is a partial sectional view taken along the line III—III of FIG. 1;

FIG. 4 is a fragmentary sectional view taken along the line IV—IV of FIG. 2;

FIG. 5 is a plan view of the embodiment shown in FIG. 1 illustrating the results of a blood grouping and a cross matching test having been performed for a blood donor and blood recipient;

FIG. 6 is a plan view of the embodiment shown in FIG. 2 illustrating the results of a blood grouping test performed on a person, and visually illustrating the blood grouping of said person;

FIG. 7 is an enlargged plan view of the cross-matching cavity shown in the left portion of FIG. 5, and illustrates the results of a cross matching test between a blood donor's cells and a blood recipient's serum;

FIG. 8 is an enlarged plan view of the cross matching cavity shown in the right hand portion of FIG. 5 and illustrates the results of a cross matching test performed with a blood recipient's cells and a blood donor serum;

FIG. 9 is a fragmentary sectional view taken along the line IX–IX of FIG. 6;

FIG. 10 is a plan view of the embodiment of the present invention shown in FIGS. 1 and 5 and illustrating the identification card enclosed in a protected package;

FIG. 11 is a plan view of the embodiment of the present invention shown in FIGS. 2 and 6 and illustrates the identification card as having a transparent protective coating applied to the uppermost surface thereof;

FIG. 12 is a fragmentary sectional view taken along the line XII—XII of FIG. 10; and FIG. 13 is a fragmentary sectional view taken along the line XIII—XIII of FIG. 11.

Referring now to the drawings, in FIG. 1 an identification card 1 is shown which contains both blood grouping and cross matching information relating to the blood of both the blood donor and the blood recipient. Areas designated 2, 3 and 4 are isolated from each other and correspond to identification of a blood donor's blood grouping. Area 2 has deposited therein a quantity of serum 5 which exists in the form of a dried coating that has been applied to a scored portion of area 2. Serum 5 contains anti-A bodies which, when mixed with the blood of a person having blood belonging to group A, will agglutinate or clump, thus giving the viewer of identification card 1 information relating to the donor's blood grouping. Similarly, area 3 contains a quantity of serum 6 which has been applied to a scored or abraded portion of area 3. Serum 6, possessing anti-B bodies will agglutinate or clump when exposed to blood belonging to group B. Area 4 contains serum 7 which is applied to identification card 1, as in the case for sera 5 and 6. Upon the application of blood to serum 7, agglutination or clumping will be visible if the blood is Rh positive, while there will be no agglutination or clumping if the blood is Rh negative. This is due to the presence of anti-Rh bodies present in serum 7.

Spaces 8, 9 and 10 correspond to aforementioned spaces 2, 3 and 4. Spaces 8, 9 and 10 indicate blood grouping information relating to the blood recipient whose blood is applied in drops as in the case for the blood donor. Sera 11, 12 and 13 may be identical with sera 5, 6 and 7 respectively and will contain anti-A, anti-B and anti-Rh bodies for causing agglutination or clumping which will indicate the recipient's blood grouping. The method of securing sera 5–7 and 11–13 to identification card 1 will be described later.

Having described means for determining the blood grouping of a donor and recipient, the identification card 1 as shown in FIG. 1 is further adapted to indicate the blood cross matching of said donor and recipient. Despite the fact that a donor and recipient may have identical blood grouping or apparently compatible blood grouping with respect to each other's blood, it is known that incompatibility may exist which is not ascertainable from the information provided by the blood grouping indicating means. As often occurs, agglutination or clumping may occur when the blood of a donor is mixed with the apparently compatible blood of a recipient, thereby causing medical complications and sometimes death of the recipient. For this reason the present invention provides in identification card 1 quick and efficient means for determining cross matching data, which information becomes a permanent record, and identification card 1 may be referred to on future occasions.

Card 1 has formed therethrough openings 14 and 15, as can be seen in FIG. 1 in the lower portion thereof. A member 17 is secured to the underside 16 of card 1 which is preferably of a transparent material. Member 17 is attached to card 1 (FIG. 3) such that a liquid-tight seal exists between the uppermost surface 18 of card 1 and underside 16. A cavity 19 is thereby formed of a depth substantially equal to the thickness $t$ of card 1 and which is adapted to receive predetermined amounts of liquids to be tested. Cavity 19 is labeled, as shown in FIG. 1, to indicate that a blood donor's cells and a blood recipient's serum will be mixed and tested therein.

Cavity 20 is formed in identification card 1 in much the same manner as cavity 19 and has member 21 for its base, which corresponds to member 17, being transparent and further being secured in a liquid-tight seal with the underside 16 of identification card 1 immediately under opening 15. Cavity 20 is used to mix a blood recipient's cells with the serum of a blood donor and is labeled accordingly.

Members 17 and 21 are preferably transparent such that upon mixing the cells of the donor and the serum of the recipient, or the cells of the recipient and the serum of a donor, the reaction resulting from said mixture may be more easily observed by placing identification card 1 between a light source and the observer such that light will penetrate members 17 and 21, thereby clearly indicating any agglutination or clumping that may be present in the resultant mixture. The results of blood grouping and cross matching tests are shown in FIGS. 5–8 and are hereinafter described.

Referring now to FIG. 2 of the drawings, an identification card 22 is illustrated as being labeled with the name and address of the person who will either carry card 22 or keep said card in a temporary or permanent record place. Card 22 is adapted to indicate blood grouping data and may contain other information on its face for record-keeping purposes. Space 23 is provided to indicate the blood group of the person whose blood is being tested with identification card 22, which information may be transcribed from the visual indication of tests which will exist below space 23. Similarly, space 24 is provided to indicate the negative or positive Rh factor which will be indicated by the tests to be described. The lower portion of card 22 is separated into three areas, namely 25, 26 and 27, which are marked with rectangular boundaries for ease in using the present device. One of the differences between the embodiment described as identification card 22 and the identification card 1 is that identification card 22 is mainly concerned with indicating the blood grouping of a single person who may wish to carry the card or preserve it in a file, whereas card 1 is more suitably adapted to indicate blood grouping and cross matching information necessary to perform a transfusion between a blood donor and a blood recipient.

Disposed within area 25 is a predetermined quantity of serum 28 which contains anti-A bodies. As previously described for sera 5 and 11, serum 28 will agglutinate or clump when mixed with samples of blood from a person having type A blood grouping.

Serum 29 is disposed in a predetermined amount within area 26 and, as in the case for serum 6 and 12, will agglutinate or clump when mixed with blood belonging to group B. Serum 30 is disposed in a predetermined amount within area 27 and, like sera 7 and 13, will agglutinate or clump when mixed with blood belonging to the Rh positive group. For ease and use, areas 25–27 are labeled anti-A, anti-B and anti-Rh respectively. Note that the anti-Rh area 27 may further be labeled anti-D to indicate the Rh 85% antibody presence. In order to facilitate the application of sera 28, 29 and 30 to identification card 22, the portions of areas 25–27 which would contain said sera may be scored prior to their application, as indicated in FIG. 4. Similarly, as indicated in FIG. 3, the blood grouping areas 2–4 and 8–10 for identification card 1 may be scored as shown in FIG. 3, for increasing the adhering properties of the sera to the card.

Identification cards 1 and 22, as described and shown in FIGS. 1 and 2 may consist of any suitable flat member and may be selected from materials such as plastic, cardboard, or a lamination of materials. The size of the cards may be selected according to the needs of the parties using the identification cards, and, in the case of card 22, may be of a size corresponding to the ordinary credit card commonly carried such that portability is effectuated. The size of the areas and the quantity of the sera used may also be preselected according to the intended use of the identification card. The thickness $t$ of identification card 1 or $t$ of card 22 is a function of its intended use and wear, as well as the alloted storage space available for a plurality of such cards.

Thus it is seen that the present invention embodies a card which may be used as an identification card as well as a portable means for testing and indicating blood grouping and cross matching data. The identification card of the present invention is especially suited to provide a permanent record of the tests indicating the blood grouping and cross matching information.

The ease with which the results of the tests may be read is now illustrated, and it is within the scope of the present invention to provide indicia on a portion of the identification card which will aid in the user's reading of the information. Referring, for example, to identification card 22, should there be clumping in area 25 and no clumping in area 26, the person whose blood is being tested has blood belonging to group A. If there is clumping in area 26 and no clumping in area 25, the blood being tested belongs to group B. Should there be clumping in both areas 25 and 26, the person has blood belonging to Group AB. If there is no clumping in either area 25 or 26 the person has blood belonging to group O. In area 27, if there is clumping the person has blood which is Rh positive, while if there is no clumping the person has blood which is Rh negative.

As for the cross-matching tests described for identification card 1, agglutination of clumping in either cavity 19 or 20 will indicate an incompatibility which must be brought to the attention of the person who is considering the tranfusion of blood from the blood donor to the recipient.

FIGS. 5 and 6 show identification cards 1 and 22 schematically after blood grouping and cross matching tests have been performed. Referring to FIG. 5, areas 2–4 and 8–10 correspond to the similar designations for identification card 1 shown in FIG. 1. It is seen that agglutination or clumping has occurred in areas 3, 4, 9, and 10, indicating the blood grouping of both the donor and the recipient. Using the aforementioned criteria for determining the grouping, for example, one may visually determine that both the blood donor and blood recipient have blood belonging to group B, Rh positive. The identification card 22 shown in FIG. 6 similarly shows the bearer of said card as having blood belonging to group B, Rh positive. Numeral 31 designates an agglutination which has occurred in areas 3, 9 and 26 for identification cards 1 and 22. Numeral 32 designates the agglutination of clumping with anti-Rh bodies present in areas 4, 10 and 27 respectively.

While the results of the blood grouping tests performed for both the blood donor and recipient appear to show blood which is compatible for a blood transfusion, upon referring to cavities 19 and 20, FIG. 5, it is seen that agglutination or clumping has occurred in cavity 20 wherein the cells of the recipient and the serum of the donor have been mixed. The isolated grouping 33 of cells shown in cavity 20 indicates that a problem may exist if the blood of the donor and recipient are mixed. It is for the skilled eye of the doctor to decide the true interpretation of such results, however, the results of the cross matching tests as they appear in cavities 19 and 20 on identification card 1 will not be destroyed and will exist as a permanent record and evidence of the tests actually performed. Note that the relatively uniform distribution 34 shown in FIG. 7 indicates different cross matching results for the donor cells and recipient serum.

FIG. 9, which is a fragmentary sectional view taken along the line IX—IX of FIG. 6, shows the agglutinized mixture 31 as deposited on identification card 22.

The present invention is of particular interest because of the speed with which tests may be performed. In running a blood grouping test with identification card 22, for example, a drop of saline solution is placed into areas 25 and 26 on serum 28 and 29 respectively. Two large drops of blood are allowed to fall into the area 27 on serum 30 and the mixture of blood and serum 30 is very thoroughly mixed for approximately one minute with any suitable instrument such as a flat toothpick. A small drop of blood is allowed to fall onto each of the areas 25 and 26 and the blood and sera 28 and 29 are independently mixed for about thirty seconds. The card may then be held and tilted for approximately three minutes. Thereafter the card may be set up on its edge and allowed to drain onto a surface such as a piece of filter paper and may be left to dry. After the reactive mixture has dried, a protective covering as will later be described may be applied, such as in the form of a spraying of an acrylic substance which will preserve the reaction and will render same clearly visible.

The present invention contemplates the preparation of the novel identification card as disclosed. One method will now be described, however, applicant does not intend to be limited thereto. Serum 5, 11 and 28 have been described as containing anti-A bodies. To this serum predetermined quantities of dextrose, benzoic acid, Knox gelatin and polyvinyl alcohol are added. The dextrose is helpful in providing a more rapid reaction. Benzoic acid serves as a preservative. The Knox gelatin functions as a binder in aiding the mixture to adhere to the identification card. Polyvinyl alcohol will render a more uniform reaction. These four substances in predetermined amounts are also added to the sera containing anti-B bodies (6, 12 and 29) and anti-Rh bodies (7, 13 and 30). The serum containing anti-Rh bodies is further subjected to the addition of heparin, which has favorable blood coagulation properties. The respective mixtures are placed in their designated areas on the identification cards and are exposed to ultraviolet light for approximately fifteen minutes. Thereafter preservative measures may be taken wherein the identification cards may be placed in suitable plastic bags which are also exposed to ultraviolet light. The identification cards may then be conveniently stored under refrigeration. It is also within the scope of the present invention for the plastic bags to contain nitrogen gas or to be vacuum sealed. It is further contemplated to either spray or otherwise apply a transparent coating to the uppermost surface of the identification card.

Referring to FIG. 10, identification card 1 is shown enveloped by a transparent material such as plastic. Envelope 35 has an upper member 36 and a lower member 37 which may be sealed around their edges to contain an inert atmosphere, nitrogen gas or to be vacated. FIG. 12 shows the "sandwich" relationship between upper member 36, card 1 and lower member 37 when sealed. When preserved as described, the identification card may last indefinitely.

FIG. 11 shows an alternate method of preserving the identification card after blood grouping tests have been performed therewith by providing a coating 38 which may be sprayed on the face of card 22. Other methods of preserving the results of reactions and for preserving the sera prior to use are also within the scope of the present invention. It is further contemplated that the addition of known solutions of titre may be added to the constitutents as disclosed to render them more reactive.

The embodiments of the invention particularly disclosed are presented merely as examples of the invention. Other embodiments, forms and modifications of the invention coming within the proper scope of the appended claims will of course readily suggest themselves to those skilled in the art.

What is claimed is:

1. An identification card, comprising:
   means for indicating information relating to blood, comprising
      a sheet having an upper surface and a lower surface, said sheet having a first opening and a second opening formed therethrough;
      a first support member secured to a portion of said lower surface adjacent the first opening and covering said first opening thereby forming a first liquid-tight cavity of a depth substantially equal to the thickness of said sheet, said first liquid-tight cavity adapted to receive predetermined amounts of a blood donor's blood cells and predetermined amounts of a blood recipient's blood serum;
      a second support member secured to a portion of said lower surface adjacent the second opening and covering said second opening thereby forming a second liquid-tight cavity of a depth substantially equal to the thickness of said sheet, said second liquid-tight cavity adapted to receive predetermined amounts of a blood recipient's blood cells and predetermined amounts of a blood donor's blood serum;
   means for receiving and indicating the grouping of a blood donor's blood;
   means for receiving and indicating the grouping of a blood recipient's blood, said receiving and indicating means including a quantity of sera secured to and disposed on said upper surface and adapted to be mixed with blood samples;
   means for indicating the identity of the blood donor and blood recipient and for correlating the blood grouping with said identity, said identification card enabling the simultaneous determination of donor and recipient blood grouping and cross-matching; and
   means for protecting said member from the atmosphere including a transparent material secured to a portion of said upper surface and separting said upper surface from the atmosphere.

2. A card for identifying and recording characteristics of the blood of a single individual comprising, a substantially flat backing member, a plurality of discrete scored areas on one surface of said member, a dried coating of serum on each said area adapted to receive blood specimens and transparent means for covering at least said areas to protect the materials deposited thereon.

3. A card according to claim 2 on which there are three scored areas, the serum on one containing anti-A bodies, the serum on another containing anti-B bodies and the serum on another containing anti-Rh bodies.

4. A card according to claim 3 in which each serum is mixed with dextrose, benzoic acid, gelatin and polyvinyl alcohol.

5. A card according to claim 4 in which the serum containing anti-Rh bodies is further mixed with heparin.

6. A card according to claim 2 which includes a second plurality of discrete scored areas, each coated with dried serum and adapted to receive blood specimens of a second individual for comparison with the first mentioned specimens.

7. A card according to claim 6 wherein each plurality of areas consists of three such areas, the serum on one containing anti-A bodies, the serum on another containing anti-B bodies and the serum on another containing anti-Rh bodies.

8. A card according to claim 7 which includes a pair of open top liquid-tight cavities.

9. A card according to claim 8 in which the bottom wall of each cavity is transparent.

References Cited

UNITED STATES PATENTS

| | | | |
|---|---|---|---|
| 2,350,239 | 5/1944 | Kohn | 73—61 |
| 2,770,572 | 11/1956 | Eldon. | |
| 2,822,476 | 2/1958 | Osgood | 21—102 |
| 3,074,853 | 1/1963 | Brewer | 424—12 |
| 3,232,710 | 2/1966 | Rieckmann et al. | |

OTHER REFERENCES

Thalhimer et al., J.A.M.A. 118, No. 5, 370–372 (1942).
Thalhimer, W., J.A.M.A. 149, No. 10, 928–930 (1952).

MORRIS O. WOLK, Primary Examiner
R. M. REESE, Assistant Examiner

U.S. Cl. X.R.
23—230; 424—11